Oct. 9, 1928.

R. C. NEWHOUSE

COUPLING

Filed March 17, 1924

1,687,035

Inventor
R. C. Newhouse
by
Attorney

Patented Oct. 9, 1928.

1,687,035

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

COUPLING.

Application filed March 17, 1924. Serial No. 699,665.

This invention relates in general to improvements in the art of drivingly connecting rotary elements, and relates more specifically to improvements in the construction and operation of couplings for connecting driving and driven rotatable elements such as shafts.

An object of the invention is to provide a coupling which is simple in construction and efficient in operation. Another object of the invention is to provide a simple and efficient coupling for connecting elements which are rotatable about different axes.

It has heretofore been proposed to provide a coupling for rotary elements such as shafts, wherein the driving and driven elements are connected by means of spring bars placed in holes or slots formed in members attached to the adjacent ends of the driving and driven elements respectively. In the prior structures of this kind, the holes or slots were normally alined and were of rectangular cross section, being of greater cross sectional area at their adjacent ends in order to permit deflection of the bars to accommodate for slight non-alinement or relative angularity between the axes of the driving and driven shafts, and also in order to accommodate momentary variations in the relative speed of rotation of the driving and driven elements. Such structure of the prior art is disclosed in U. S. Patent 524,087, granted Aug. 7, 1894.

The objection to these prior art structures was that the spring bars could not be universally deflected in all directions within the holes or slots in the motion transmitting members, as the adjacent ends of the holes or slots were widened only circumferentially and not radially. Unless the holes or slots permit universal and unrestricted deflection of the connecting bars in any direction, maximum efficiency is not attainable and considerable energy is absorbed due to friction, when the coupling is utilized to connect driving and driven elements having non-coincident axes.

The present invention contemplates provision of a flexible coupling of the general type disclosed in the above identified patent, wherein the motion transmitting bars or pins are freely deflectable in any direction thus enabling efficient transmission of power between elements having either non-alined parallel or relatively tilted axes. The invention further contemplates the provision of a flexible coupling which may be conveniently manufactured at minimum cost and which may be readily assembled and dismantled. These and other objects and advantages of the present improvement will be apparent in the course of the accompanying description.

A clear conception of an embodiment of the invention and of the operation of devices constructed in accordance therewith may be had by referring to the drawing accompanying and forming a part of this specification in which like reference characters designate the same or similar parts in the various views.

Figure 1:
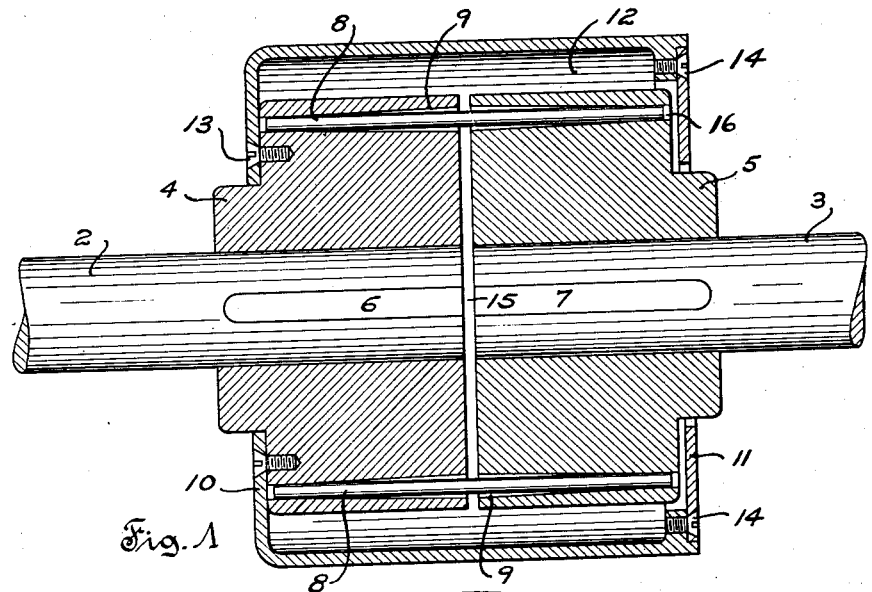
Fig. 1 is a central vertical section through an improved flexible shaft coupling.
Figure 2:
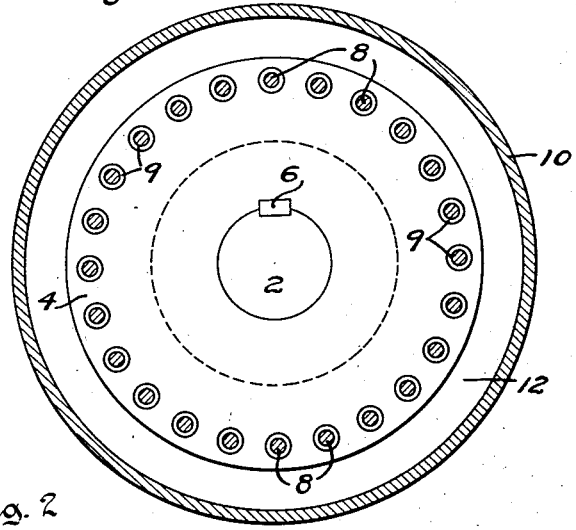
Fig. 2 is a transverse vertical section through the improved flexible shaft coupling, the section being taken between the connected shafts.
Figure 3:
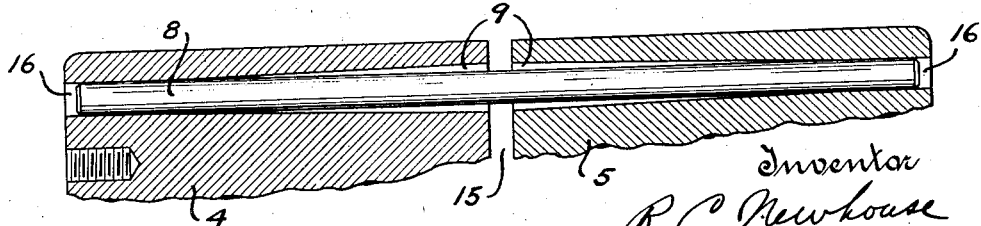
Fig. 3 is an enlarged fragmentary central vertical section through the improved flexible shaft coupling, showing the details of construction of the deflectable motion transmitting pins.

The improved coupling specifically illustrated herein comprises in general a pair of adjacent members, 4, 5 rigidly attached to shafts 2, 3 respectively by means of keys 6, 7 respectively, and an annular series of deflectable cylindrical motion transmitting pins 8 connecting the members 4, 5. The members 4, 5 are separated by a slight space 15 and have normally alined circular tapered holes 9 therein, within which the pins 8 are disposed. The extremities of the pins 8 are slidably fitted within cylindrical bores 16 formed in the members 4, 5 and merging into the smaller ends of the tapered holes 9 of these members. As clearly indicated in Fig. 2, the tapered holes 9 have circular cross section throughout their length, the greatest cross sectional area of these holes being at the adjacent ends of the members 4, 5. The peripheries of the members 4, 5 are surrounded by a casing 10 secured to one end of the member 4 by means of screws 13, and a cap 11 secured to the overhanging end of the casing 10 by means of screws 14 cooperates with the casing 10 to form an annular lubricant receptacle 12.

During normal operation of the coupling and assuming the axes of the shafts 2, 3 to be in alinement, rotary motion is transmitted from one of the shafts 2, 3 to the other through the keys 6, 7, the members 4, 5, and the annular series of pins 8. If a change of speed is effected in either of the shafts 2, 3 the pins 8 may be deflected circumferentially within the tapered holes 9 to avoid shock in transmission of the motion. If there is a tendency toward end play in either one of the shafts 2, 3 and not in the other, such end play will be accommodated by sliding of the pins 8 within the bores 16 of the members 4, 5.

When the axes of the shafts 2, 3 are non-alined, the pins 8 will automatically gyrate within the circular tapered holes 9 during rotation of the shafts 2, 3, and will compensate for non-alinement of the shafts 2, 3 without undesirable absorption of energy due to friction. The holes 9 are preferably so formed that distortion of the pins 8 will be gradual and complete contact between the side walls of the cylindrical pins 8 and the circular tapered bores 9 will only be effected when maximum distortion of the pins 8 is produced. The pins 8 must of course be of sufficient strength to enable them to readily transmit the desired power from one shaft 2, 3 to the other without breaking.

It will be obvious that the bores 16 of the members 4, 5 may be readily formed by drilling and that the tapered circular holes 9 may likewise be formed by drilling and subsequent reaming. The tapers of the holes 9 may thus be accurately and conveniently produced. The pins 8 may be formed of standard rod material of the desired diameter cut into proper lengths. The casing 12 may be supplied with a suitable quantity of grease or other lubricant for maintaining effective lubrication of the bearings between the pins 8 and the members 4, 5. The coupling may be readily dismantled by merely removing the end cover 11 and withdrawing the member 5 from within the casing 12.

It should be understood that it is not desired to limit the invention to the exact details of construction and operation herein shown and described, for various modifications within the scope of the claims may occur to persons skilled in the art.

It is claimed and desired to secure by Letters Patent:

1. A flexible coupling comprising, rotary driving and driven members having normally alined holes provided with tapered circular bounding surfaces, the surface of the hole of one member converging away from that of the other, and a circular resilient pin having its end portions snugly confined but slidable within the smallest portions of said holes, and the medial portion of said pin being universally deflectable into contact with said tapered surfaces.

2. A flexible coupling comprising, rotary driving and driven members having normally alined holes each provided with a tapered circular bounding surface and a cylindrical bounding surface merging with the tapered surface thereof, the tapered bounding surface of the hole of one member converging away from that of the other, and a cylindrical resilient pin having its end portions snugly confined but slidable within said cylindrical bounding surfaces of said holes, and the medial portion of said pin being universally deflectable into contact with said tapered surfaces.

3. A flexible coupling comprising rotary driving and driven members having normally alined circular holes, and a circular resilient pin having its medial portion spaced from and its end portions snugly confined but slidable within the said holes, the medial portion of said pin being universally deflectable into contact with the walls of said holes.

4. A flexible coupling comprising rotary driving and driven members having sets of normally alined circular holes, and a plurality of circular resilient pins having their medial portions spaced from and their end portions snugly confined but slidable within the said holes, the medial portion of each pin being universally deflectable into contact with the walls of its respective set of holes.

In testimony whereof, the signature of the inventor is affixed hereto.

RAY C. NEWHOUSE.